(12) United States Patent
Le Ravalec-Dupin et al.

(10) Patent No.: US 7,558,708 B2
(45) Date of Patent: Jul. 7, 2009

(54) METHOD OF RECONSTRUCTING A STOCHASTIC MODEL, REPRESENTATIVE OF A POROUS HETEROGENEOUS MEDIUM, TO IMPROVE ITS CALIBRATION BY PRODUCTION DATA

(75) Inventors: Mickaële Le Ravalec-Dupin, Rueil Malmaison (FR); Lin-Ying Hu, Rueil Malmaison (FR); Frédéric Roggero, Pau (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 257 days.

(21) Appl. No.: 11/114,182

(22) Filed: Apr. 26, 2005

(65) Prior Publication Data

US 2006/0241920 A1    Oct. 26, 2006

(30) Foreign Application Priority Data

Apr. 27, 2004    (FR) .................................. 04 04492

(51) Int. Cl.
*G06F 17/10* (2006.01)

(52) U.S. Cl. ............................................. 703/2; 703/10

(58) Field of Classification Search ..................... 703/2, 703/10
See application file for complete search history.

(56) References Cited

U.S. PATENT DOCUMENTS

| | | | |
|---|---|---|---|
| 7,188,048 B2 * | 3/2007 | Kouritzin et al. ............. | 702/181 |
| 2006/0184043 A1 * | 8/2006 | Tromberg et al. ............. | 600/476 |
| 2006/0241925 A1 * | 10/2006 | Schaaf et al. | |

FOREIGN PATENT DOCUMENTS

| | | |
|---|---|---|
| EP | 0 864 882 A2 | 9/1998 |
| FR | 2 795 841 | 1/2001 |

OTHER PUBLICATIONS

Ning Liu, Master Thesis (Assessment of uncertainty methods used in reservoir performance simulation), 2001.*
Easley D.H., Borgman L.E., Shive P.N.: "Geostatistical simulation for geophysical applications—Part 1: Simulation" vol. 55, No. 11, Nov. 1-30, 1999, pp. 1435-1440 XP002308198.

* cited by examiner

*Primary Examiner*—Paul L Rodriguez
*Assistant Examiner*—Andre Pierre Louis
(74) *Attorney, Agent, or Firm*—Antonelli, Terry, Stout & Kraus, LLP.

(57) ABSTRACT

A method of reconstructing a stochastic realization, continuous or discrete, resulting from a random function representing a numerical model, can be representative of a porous heterogeneous medium such as an underground reservoir. It is based on identification, for a given realization, of a random function and of a set of random numbers allowing, from a given geostatistical simulator, to reconstruct the reference realization. The reconstruction techniques proposed are either general or specific to a type of geostatistical simulator. They concern the sphere of optimization, relaxation, filtering and sequential approaches. The reconstruction method allows to estimate a set of random numbers for regenerating the reference realization, this reference realization can then be locally or globally modified, by gradual deformation, so as to better reproduce newly acquired dynamic data (production data for example). The method is applicable notably to oil reservoir development for example.

8 Claims, 9 Drawing Sheets

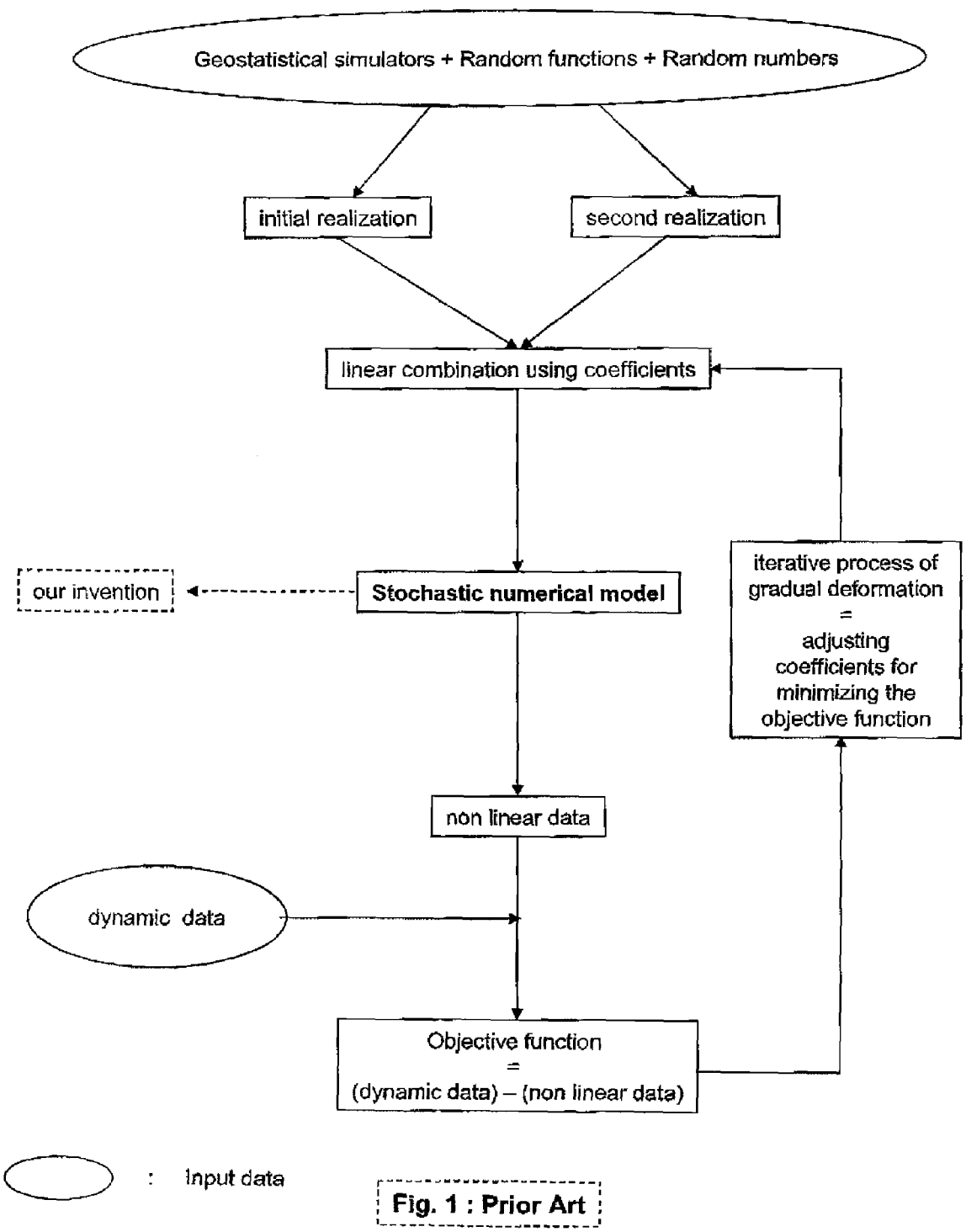

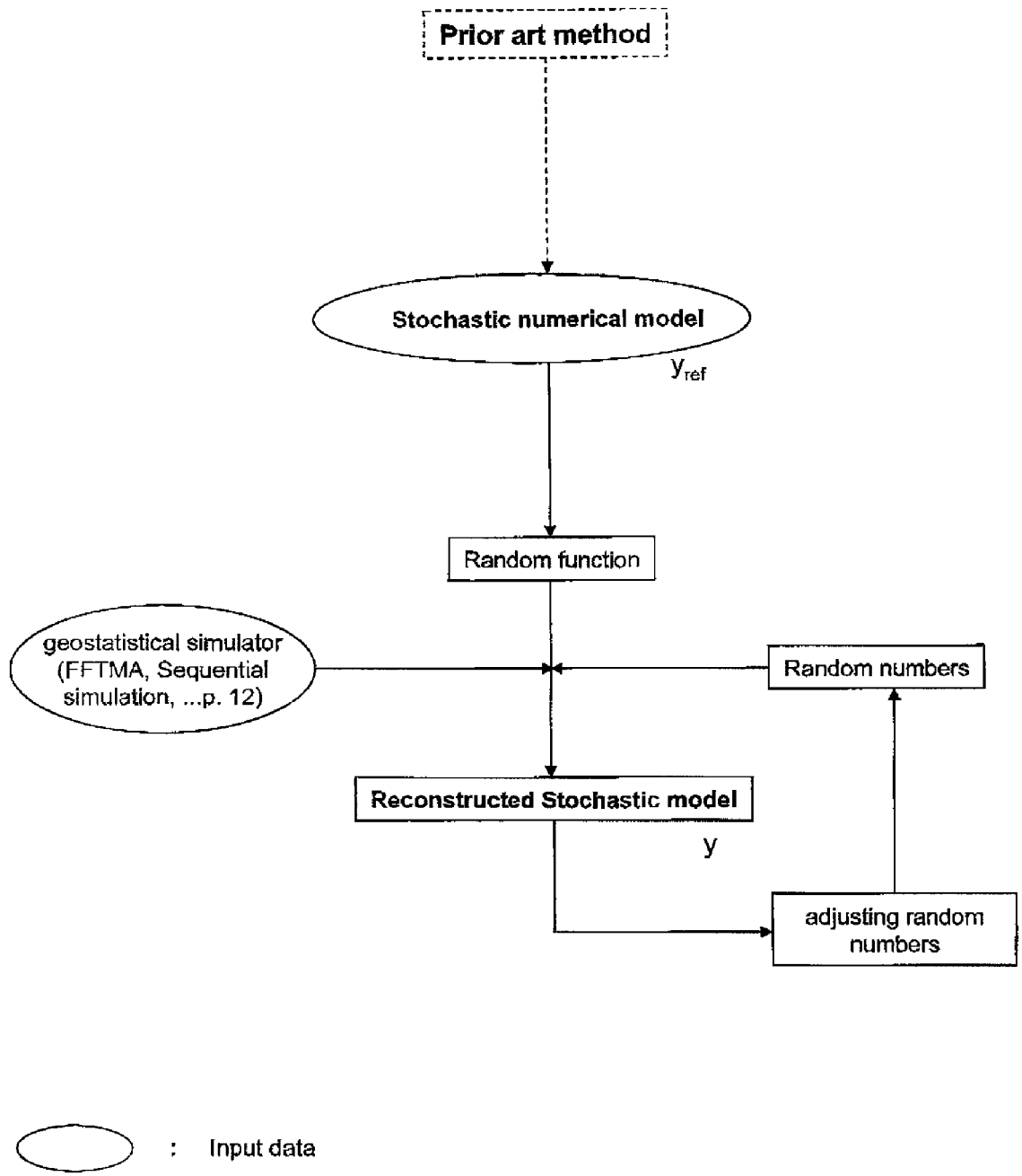

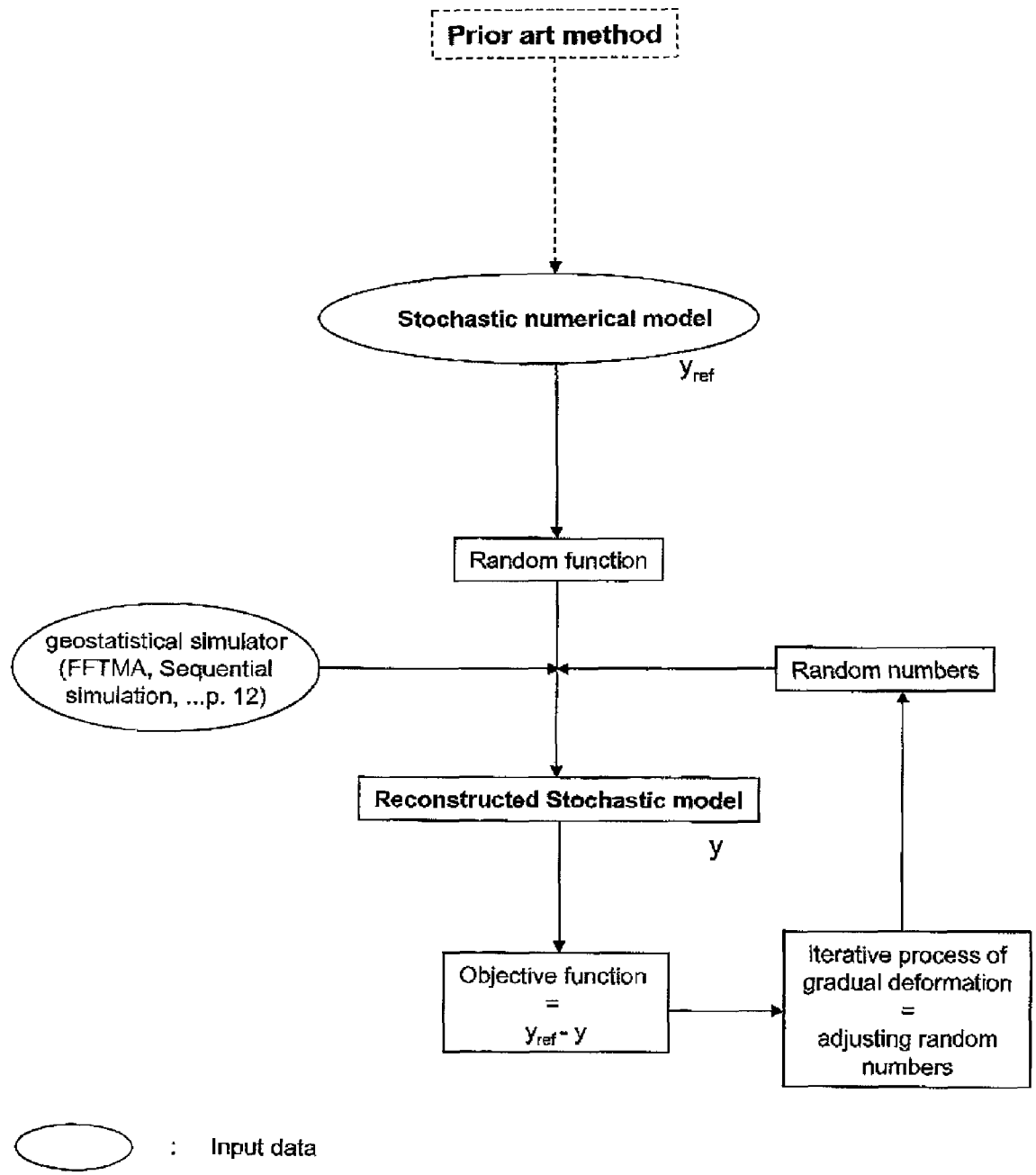
Fig. 3 : One embodiment of our invention

Fig. 6
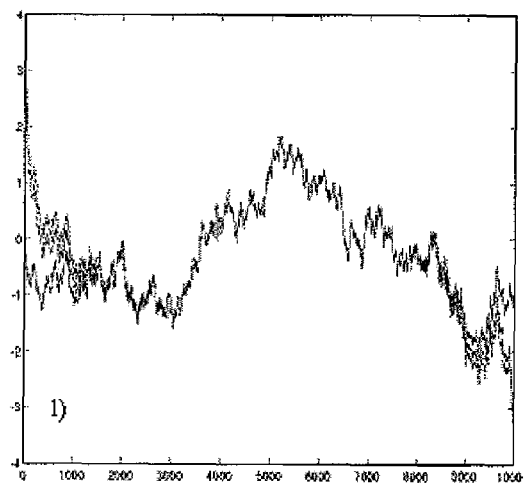
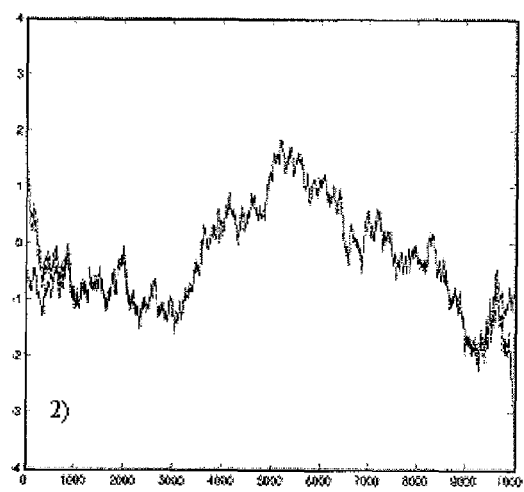
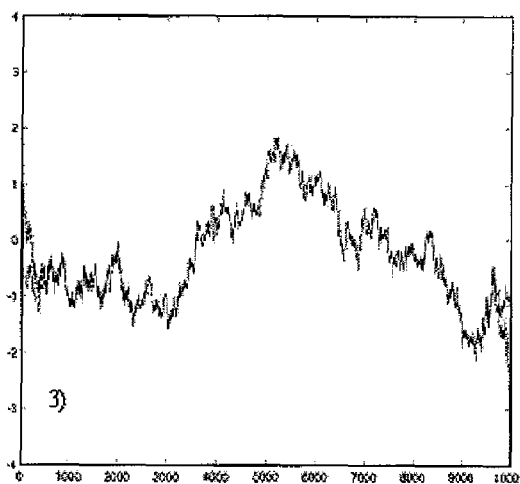
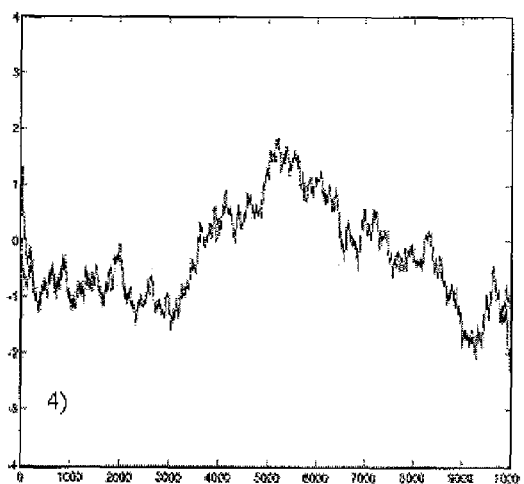

METHOD OF RECONSTRUCTING A STOCHASTIC MODEL, REPRESENTATIVE OF A POROUS HETEROGENEOUS MEDIUM, TO IMPROVE ITS CALIBRATION BY PRODUCTION DATA

FIELD OF THE INVENTION

The present invention relates to a method of reconstructing a numerical stochastic model resulting from a realization of a random function and representative of the distribution of a physical quantity in a porous heterogeneous medium.

In particular, the method according to the invention applies to the reconstruction of a numerical stochastic model used to represent the spatial distribution, in an underground zone, of continuous or discrete physical properties such as permeability, lithology type or porosity. It aims to give the engineer means to re-use a numerical stochastic model worked out in the past, to improve its description by integrating for example newly acquired production data. This improvement stage requires for example a data calibration or optimization procedure. The method according to the invention thus makes it possible to reconstruct an existing numerical stochastic model in order to improve it, for example by deforming it locally or globally.

BACKGROUND OF THE INVENTION

Studying an underground zone requires construction of numerical reservoir models. A numerical model consists of a grid with N dimensions (N>0 and generally two or three) each cell of which is assigned the value of a property characteristic of the zone studied. It can be, for example, the porosity or the permeability distributed in a reservoir. Such a value is referred to as regionalized variable. It is a continuous variable, spatially distributed, and representative of a physical phenomenon. From a mathematical point of view, it is simply a function $z(u)$ taking a value at each point u (the cell of the grid) of a field of study D (the grid representative of the reservoir). However, the variation of the regionalized variable in this space is too irregular to be formalized by a mathematical equation. In fact, the regionalized variable represented by $z(u)$ has both a global aspect relative to the spatial structure of the phenomenon studied and a random local aspect.

This random local aspect can be modelled by a random variable (VA). A random variable is a variable that can take a certain number of realizations z according to a probability law. Continuous variables such as seismic attributes (acoustic impedance) or petrophysical properties (saturation, porosity, permeability) can be modelled by VAs. Therefore, at point u, the regionalized variable $z(u)$ can be considered to be the realization of a random variable Z.

However, to properly represent the spatial variability of the regionalized variable, it must be possible to take into account the double aspect, both random and structured. One possible approach, of probabilistic type, involves the notion of random function. A random function (FA) is a set of random variables (VA) defined in a field of study D (the grid representative of the reservoir), i.e. $\{Z(u), u \in D\}$, also denoted by $Z(u)$. Thus, any group of sampled values $\{z(u_1), \ldots, z(u_n)\}$ can be considered to be a particular realization of random function $Z(u) = \{Z(u_1), \ldots, Z(u_n)\}$. Random function $Z(u)$ allows to take into account both the locally random aspect (at $u_\alpha$, the regionalized variable $z(u_\alpha)$ being a random variable) and the structured aspect (via the spatial probability law associated with random function $Z(u)$).

The realizations of a random function provide stochastic reservoir models. From such models, it is possible to appreciate the way the underground zone studied works. For example, simulation of the flows in a porous medium represented by numerical stochastic models allows, among other things, to predict the reservoir production and thus to optimize its development by testing various scenarii.

Construction of a stochastic reservoir model can be described as follows:

First, static data are measured in the field on the one hand (logging, measurements on samples taken in wells, seismic surveys, . . . ) and, on the other hand, dynamic data are measured (production data, well tests, breakthrough time, . . . ), whose distinctive feature is that they vary in the course of time as a function of fluid flows in the reservoir, then, from the static data, a random function characterized by its covariance function (or similarly by its variogram), its variance and its mean is defined, besides, a set of random numbers drawn independently of one another is defined: it can be, for example, a Gaussian white noise or uniform numbers. We thus have an independent random number per cell and per realization, finally, from a selected geostatistical simulator and from the set of random numbers, a random draw in the random function is performed, giving access to a (continuous or discrete) realization representing a possible image of the reservoir. In general, this realization does not verify the punctual measurements. An additional operation based on kriging techniques allows to modify the realization by making it meet these measurements. This technique is described for example in the following document:

Chilès, J.P., and Delfiner, P., 1999, Geostatistics—*Modeling spatial uncertainty, Wiley series in probability and statistics*, New York, USA, at this stage, the dynamic data have not been considered. They are integrated in the reservoir models via an optimization or a calibration. An objective function measuring the difference between the dynamic data measured in the field and the corresponding responses simulated for the model considered is defined. The goal of the optimization procedure is to modify little by little this model so as to reduce the objective function.

In the end, the modified models are coherent in relation to the static data and the dynamic data. This reservoir model construction stage requires considerable engineering time and calculating time.

Since the reservoir model calibration techniques using dynamic data have markedly improved during the past years as a result of the power increase of computers and of the appearance of new parametrization techniques, and since the hydrocarbon recovery techniques have also markedly improved, reservoir engineers frequently need to go back over reservoir models worked out in the past. The goal is to fine down these models and to update them by means of the data acquired since the time when the model had been initially worked out.

However, an essential difficulty still remains when going back over numerical models worked out in the past. In fact, to apply a method allowing to fine down calibration of an existing realization, the number of random numbers which, when given to the geostatistical simulator, provides the numerical model (the realization) in question has to be known. Now, in general, this information no longer exists. Similarly, the variogram (or covariance) model characterizing the spatial variability in the underground zone of the attribute represented and necessary to characterize the random function is no longer known. The latter point is less important insofar as a study of the existing numerical model can allow to find this variogram again. On the other hand, there is so far no method for determining the set of random numbers underlying the numerical model.

The method according to the invention allows to reconstruct numerical stochastic models, i.e., for a previously determined random function, to identify a set of random numbers which, input into a geostatistical simulator, leads to a realization similar to the numerical model considered. It comprises several algorithms, iterative or not, which, depending on the conditions, allow to reconstruct continuous or discrete realizations.

Furthermore, the reconstruction techniques developed are compatible with the gradual deformation method, a geostatistical parametrization technique meeting engineers' needs and presented in the following article:

Hu, L.-Y., 2000, *Gradual deformation and iterative calibration of Gaussian-related stochastic models*, Math. Geol., 32(1), 87-108.

In fact, it allows to resume the study of a reservoir and to modify it partly in the zones where new data are available, as described in the document as follows:

Le Ravalec-Dupin, M., Noetinger, B., Hu, L.-Y., and Blanc, G., 2001, *Conditioning to dynamic data: an improved zonation approach*, Petroleum Geosciences, 7, S9-S16.

SUMMARY OF THE INVENTION

The invention relates to a method for reconstructing a numerical stochastic model, defined by an at least one-dimensional grid each cell of which is assigned the value of at least one physical quantity characteristic of a porous heterogeneous medium. The method comprises the following stages:

characterizing a random function by statistical analysis of said values of the cells of said numerical stochastic model, selecting a geostatistical simulator, identifying a set of random numbers which, given to the geostatistical simulator selected, provides a representation close to said numerical stochastic model.

According to the invention, characterization of the random function can comprise a decomposition of said physical quantity into two terms, a non-stationary mean and a perturbation, so as to bring out a non-stationary tendency.

Identification of the random numbers can comprise using one of the following techniques : optimization, relaxation, filtering, sequential method and a combination of these techniques.

The technique of reconstruction by optimization can comprise minimization of an objective function measuring the difference between said numerical stochastic model ($y_{ref}$) and a simulated model (y), and it is possible to use the gradient of the objective function with respect to the random numbers to reconstruct the model by optimization.

The technique of reconstruction by filtering can be applied to the reference realization whose support has been enlarged to allow to find the edges of the reference realization again.

The reconstruction technique using the sequential method can comprise blocking the order in which the cells are visited.

Finally, according to the invention, identification of the random numbers allows to modify, by gradual deformation, the reconstructed model in a global or local way.

BRIEF DESCRIPTION OF THE FIGURES

Other features and advantages of the method according to the invention will be clear from reading the description hereafter of non limitative embodiment examples, with reference to the accompanying figures wherein:

FIG. 1 shows an example of a reference realization (thin line), the theoretical non-stationary mean considered to generate the reference realization (dotted line) and the estimated non-stationary mean (thick line), FIG. 2 shows, at the top, a realization example with 2 facies and, at the bottom, the proportions estimated for facies 2 (thick line) compared with the theoretical proportions (dotted line), FIG. 6 shows an example of correction, in five iterations, of the edge effects by relaxation (from left to right and vertically)

DETAILED DESCRIPTION

Figure 3A:
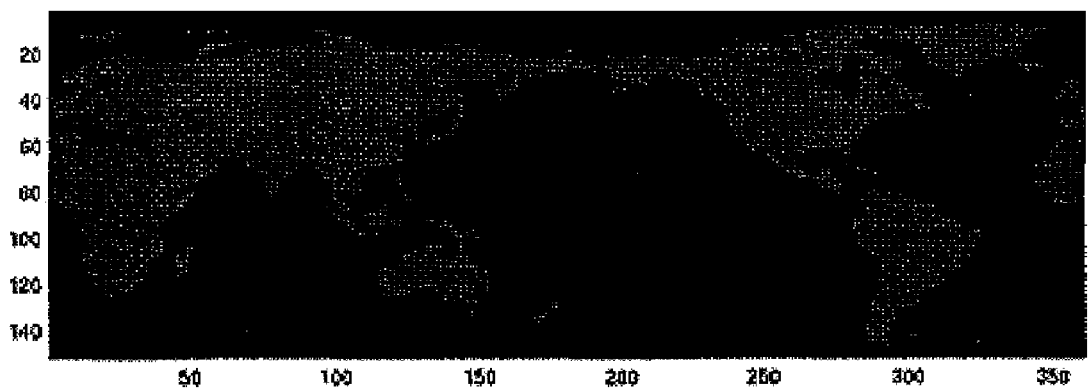
FIG. 3A shows an example of an existing stochastic model to be reconstructed.

The method according to the invention allows to reconstruct numerical stochastic models, i.e. to determine a random function, then to identify a set of random numbers which, input into a geostatistical simulator, leads to a realization similar to the numerical model considered. Identification of the random numbers is done using several algorithms, iterative or not, suited to the case of the continuous or discrete realizations. The method of reconstructing a given stochastic model can then be decomposed into 3 stages:

1—Determination of a random function by statistical analysis

2—Selection of a geostatistical simulator

3—Identification of the set of random numbers, according to the type of simulator selected and to the type of realization (discrete or continuous). Depending on the case, 4 techniques can be considered separately or in combination:

reconstruction by optimization, reconstruction by relaxation, reconstruction by filtering (Wiener), reconstruction by sequential methods.

These developed reconstruction techniques are compatible with the gradual deformation method. It is a geostatistical parametrization technique which meets engineers' needs. In fact, it allows to resume the study of a reservoir and to modify it partly in zones where new data are available.

The problem to be solved is as follows. Knowing a realization $y_{ref}$(numerical stochastic model), referred to as reference realization, can we identify a set of random numbers, or more specifically a Gaussian white noise z such that the geostatistical simulator S produces from z a realization y as close as possible to the reference realization? The geostatistical simulation methods produce, from a Gaussian white noise, realizations of two types: continuous realizations and discrete realizations. Typically, a continuous realization can describe the spatial distribution of an attribute such as the permeability. The permeability values evolve continuously from one point of the space to another. In parallel, a discrete realization can describe the spatial distribution of facies. The various facies are identified by an indicator: for example 1 for the reservoir facies and 2 for the non-reservoir facies. When switching from the reservoir facies to the non-reservoir facies, we have a discontinuity: we directly shift from 1 to 2. It is also possible to extend the scope of the invention to a complex model comprising facies populated by a continuously varying attribute.

The first stage of the method according to the invention consists, by statistical analysis, in determining a random function characterizing the reference realization. This analysis comprises for example an analysis of the mean, of the variance and of the covariance function C of the random function. Within the scope of a particular embodiment of the method, we choose to determine a random function characterizing the reference realization freed of the non-stationary effect. We therefore first identify a non-stationary tendency if it exists. For a continuous realization, the non-stationarity is assumed to be translated by a mean that varies in space. For a facies realization, it involves a variation of the facies proportions in space.

First let there be a continuous reference realization. We assume that it is equivalent to the sum of two terms: a mean, non-stationary and thus variable in space, of low frequency, and a perturbation, stationary, that can be characterized by a random function. The two terms are separated from a filtering procedure. The mean is extracted by carrying out the convolution product of the reference realization by a gate function. FIG. 1 shows an example of a reference realization (thin line), the theoretical non-stationary mean considered to generate the reference realization (dotted line) and the estimated non-stationary mean (thick line). The abscissa axis indicates the number of the cell and the ordinate axis indicates the value of a physical quantity associated with this cell. We can then check that this mean is close to the mean considered to produce the reference realization.

In the case of facies realizations, the non-stationarity is expressed in terms of proportions: the proportions (or probability of presence of the various facies) depend on the position. The objective is now to determine the evolution of the proportions for the various facies in space. The procedure followed is similar to that introduced to extract a non-stationary mean. Consider, for example, a two-facies reference realization generated by integrating a linear tendency for the proportions. The proportion of facies 1 is $\chi=1$ at 0 and 0 at $\chi=1000$, where $\chi$ is the position. The proportion of facies 2 is complementary. Let there be a function $f$ describing, for this reference realization, the proportion of facies 2 at any point $\chi$. In the zones where facies 2 is present, $f$ is equal to 1. Elsewhere, $f$ is zero. The convolution of $f$ with a gate function allows to derive the mean value of the proportion of facies 2 as a function of the position.

FIG. 2 illustrates, at the top, a realization example with 2 facies and, at the bottom, the estimated proportions of facies 2 (thick line) compared with the theoretical proportions (dotted line). The abscissa axis indicates the number of the cell and the ordinate axis indicates, at the top, the value of the facies associated with this cell and, at the bottom, the value of the estimated and theoretical proportions. This figure shows that the tendency brought out is close to that taken into account to create the reference realization.

We assume hereafter that the non-stationary tendencies, if they exist, have been identified.

We can then, by statistical analysis, determine a stationary random function of order 2 at least, characterizing the reference realization freed from the non-stationary effect. In fact, a statistical analysis allows to characterize the random function by determining its covariance function C.

The second stage of the method according to the invention consists in selecting a geostatistical simulator. The geostatistical simulation methods produce, from a Gaussian white noise, random function realizations. There are many geostatistical simulators, among which the FFTMA method, the sequential simulation methods and the truncated Gaussian method.

FFTMA Method

The FFTMA method in the following document:

Le Ravalec, M., Noetinger, B., and Hu, L.-Y., 2000, *The FFT-Moving Average (FFT-MA) generator: An efficient tool for generating and conditioning Gaussian simulations*, Math. Geol., 32(6), 701-723.

This method provides continuous, multi-Gaussian and stationary realizations honouring a given covariance function. These realizations are discretized on Cartesian and regular grids comprising a very large number of cells. The core of the FFTMA simulator is based on a moving average, i.e. a convolution product. The use of fast Fourier transforms accelerates calculations.

Suppose that a realization y of mean m and of covariance function C is to be generated. The simulation principle is as follows:

$$y = m + f * z.$$

z is a Gaussian white noise and $f$ results from the decomposition of the covariance function in form of a convolution product $C = f * \bar{f}$, where $\bar{f}(\chi) = \chi(-\chi)$. Function $f$ only depends on geostatistical parameters such as the covariance model, the principal axes, the correlation lengths, . . .

Sequential Simulation Methods

Another family of very widely used simulation algorithms is known as sequential simulation algorithms. There are three sequential simulation algorithm classes: Gaussian sequential simulation algorithms, indicatrix sequential simulation algorithms and sequential simulation algorithms using multipoint statistics. The first class gives continuous realizations whereas the two others are used to generate facies realizations.

The Gaussian and indicatrix sequential simulation algorithms are described in:

Goovaerts, P., 1997, *Geostatistics for natural resources evaluation*, Oxford Univ. Press, New York, USA.

The sequential simulation algorithms using multipoint statistics are described in:

Strebelle, S., 2002, *Conditional simulation of complex geological structures using multiple-point statistics*, Math. Geol., 34(1),1-21.

Truncated Gaussian Method

The truncated Gaussian method consists in applying thresholds to a standard multiGaussian realization y (of mean zero and of variance one) generated beforehand by means of any simulator. Suppose that realizations indicating by discrete values 1, 2 or 3 the presence of three facies, denoted by $F_1$, $F_2$ or $F_3$, are to be produced. Facies $F_i$ is defined by:

$$F_i = \{u, s_{i-1} < y(u) < s_i\}$$

The $s_i$ are thresholds whose values are deduced from the proportions p of the N facies present. The pluriGaussian method is an extension of the truncated Gaussian method described in the following document:

Le Loc'h, G., and Galli, A., 1997, *Truncated pluriGaussian method: Theoretical and practical points of view*, in Geostatistics Wollongong'96, 1, 211-222.

Finally, the last stage of the method according to the invention is the stage of reconstruction of the set of random numbers. According to the type of data (continuous or discrete) and to the type of simulator selected, four implementations are proposed, involving four different algorithms. In each case, mean m is assumed to be known. These four algorithms are explained and applied hereafter.

Reconstruction by Optimization

The first algorithm is the simplest and the most general technique of reconstructing a realization. It is based on an optimization procedure which consists in minimizing an objective function measuring the difference between the stochastic reference model $y_{ref}$ to be reconstructed and the simulated model y. It is a very general iterative process which is suited for reconstruction of continuous as well as facies models.

Let there be a continuous realization $y_{ref}$ known as reference realization, of mean m and of covariance function C. We now try to estimate a Gaussian white noise z allowing, when it is given to a geostatistical simulator, to construct a realization y resembling $y_{ref}$ as much as possible. This problem is dealt with in form of an optimization. An objective function J measuring the difference between reference model $y_{ref}$ and simulated model y is defined from a Gaussian white noise z:

$$J(z) = \frac{1}{2}\sum_j (y_j(z) - y_{ref_j})^2.$$

Various minimization techniques allow this function to be made as small as possible. This approach can be considered for any geostatistical simulator providing that the simulation procedure is repeated identically. For example, for the sequential simulation algorithms, the random path has to be frozen: the order in which the cells are visited must not be changed from one simulation to the next.

For such an approach to be applicable in practice, it is preferable to have the gradients of the objective function with respect to the components of the Gaussian white noise. Consider more precisely the FFTMA simulator. In this case, the Gaussian white noise z has to be determined such that:

$$y_{ref} = m + f*z$$

where f results, as mentioned above, from the decomposition of the covariance function C. We show that:

$$\frac{\partial J}{\partial z_k} = \sum_i (y_i - y_i^{ref})f_{i-k}$$
$$= [(y_i - y_i^{ref})*f]_k.$$

For the facies realizations, the use of transition facies allows to estimate the gradients. The transition facies technique is described in:

Schaaf, T. Mezghani, M. Chavent, G., 2002, *Direct Conditioning of Fine Scale Facies Models to Dynamic Data by Combining Gradual Deformation and Numerical Upscaling Techniques*, in Proceedings European Conference on the Mathematics of Oil Recovery, Freiberg, Germany, 3-6 September.

The gradients being known, an L-BFGS type algorithm can for example be used to minimize the objective function. The advantage of this type of algorithm is that it allows to consider a very large number of parameters.

This first reconstruction technique is applicable for reconstruction of continuous and discrete realizations. It can be used alone, but the problem of the definition of the initial Gaussian white noise comes up then. An interesting alternative consists in using a Wiener filter in order to rapidly construct an initial Gaussian white noise that can be improved thereafter by optimization. This point will be dealt with later.

Figure 3B:
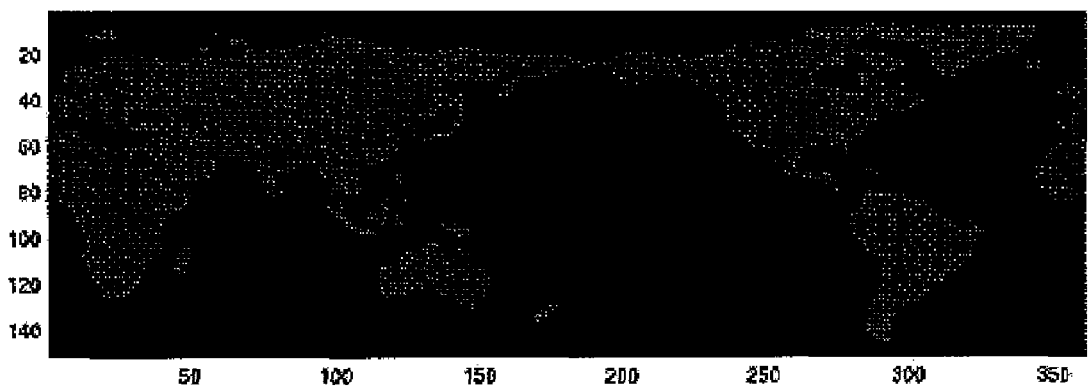
FIG. 3B shows the model reconstructed by means of the method according to the invention using the optimization algorithm.
Figure 3C:
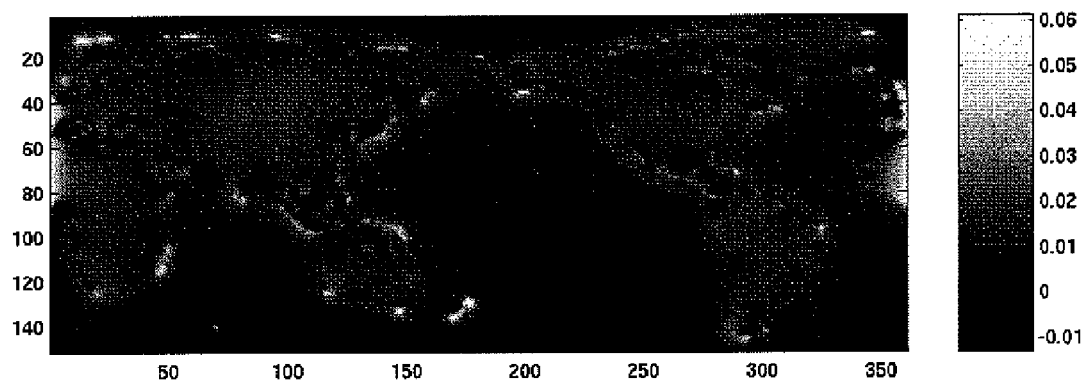
FIG. 3C shows the Gaussian white noise determined to construct the model of FIG. 3B.
Figure 3D:
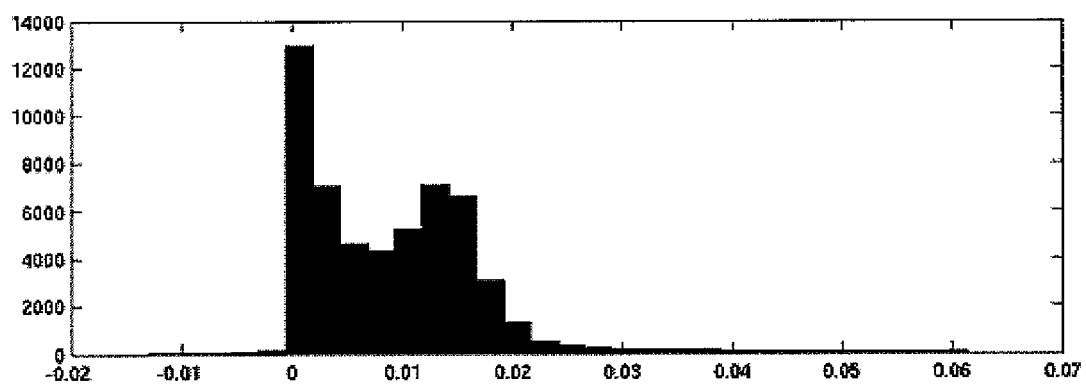
FIG. 3D shows an analysis of the distribution of the Gaussian white noise determined to construct the model of FIG. 3B.
Figure 8:
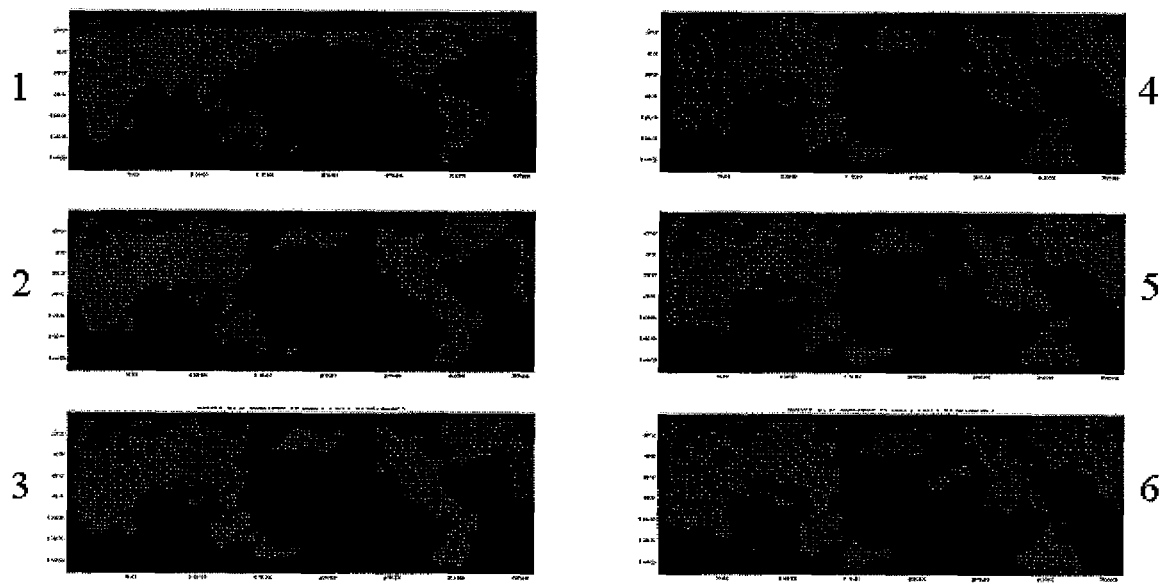
FIG. 8 shows an example of global gradual deformation applied to the reconstructed realization of FIG. 3.
Figure 9:
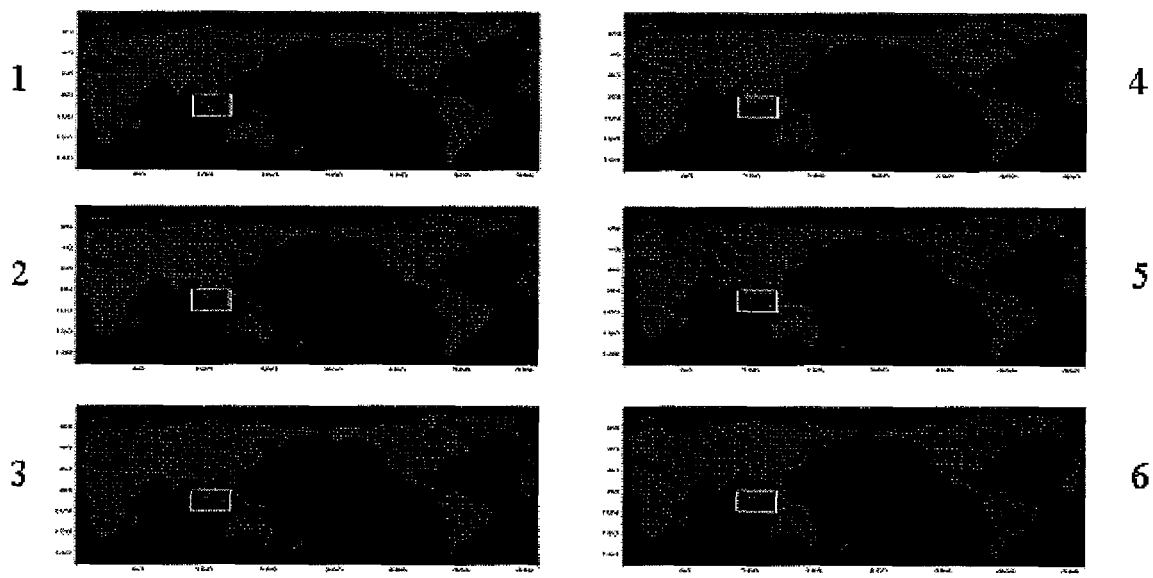
FIG. 9 shows an example of local gradual deformation applied to the reconstructed realization of FIG. 3.

FIGS. 3A, 3B, 3C and 3D illustrate an application of this reconstruction technique by optimization. We assume that the image shown in FIG. 3A is a realization of a random function (reference realization). We observe the presence of two facies: the continents at 34% and the ocean at 66%. We assume that it can be obtained from the truncated Gaussian method. The simulation process to which we refer is as follows. A continuous realization is produced by means of the FFTMA simulator. The random function considered is characterized by a zero mean, a variance equal to one and a stable and isotropic covariance model: the exponent of the covariance model is 1.4 and the correlation length is 40 cells. This realization is then provided with thresholds according to the proportions of the facies. The grid on which the realization is discretized comprises 360×151 cells. By applying an optimization approach, we estimate a Gaussian white noise z which allows to reconstruct this image satisfactorily (FIG. 3B). It can be observed in FIGS. 3C and 3D that the white noise z determined to reconstruct the image is not in fact a Gaussian white noise: FIG. 3C shows a non-random, coherent character, and FIG. 3D shows a non-Gaussian noise distribution. However, the Gaussian white noise estimation is sufficient to apply a model calibration technique such as the global gradual deformation technique as illustrated in FIG. 8, or the local gradual deformation technique as illustrated in FIG. 9.

Reconstruction By Relaxation

The second algorithm is based on a technique of iterative resolution by relaxation. It was developed more specifically for the geostatistical simulators involving a convolution product and it allows to reconstruct continuous models.

These relaxation techniques were developed to solve linear systems of Ax=B type, x being the vector grouping together the unknowns. These techniques start from an approximate solution to x and try to improve this approximation from a succession of iterations. The sequence converges (ideally) to the solution to the linear system.

Let us now go back to the problem set out in the previous section. We try to estimate a Gaussian white noise allowing, when it is given to a geostatistical simulator, to construct a realization y resembling $y_{ref}$ as much as possible. We focus here on the geostatistical simulators involving a convolution product. Take the example of the FFTMA simulator and assume, to simplify the formalism, that mean m is zero at any point of the space. The Gaussian white noise z has to be determined such that:

$$y_{ref} = f*z$$

A deconvolution operation is necessary to obtain z. Knowing that the convolution product becomes in the spectral domain a simple product, we could consider calculating the Fourier transforms of $y_{ref}$ and f and, by division, we could deduce the Fourier transform of z. This direct approach can however not be used because the Fourier transform of f comprises zero components. We propose an algorithm inspired by the relaxation techniques to perform the deconvolution.

Suppose that $y_{ref} = f * z_{ref}$. The realization that we want to reconstruct is $y_{ref}$ and $z_{ref}$ is the Gaussian white noise that provides $y_{ref}$. Function $f$ is known. We try to approximate to $z_{ref}$. Let there be an initial Gaussian white noise z and the resulting realization y: $y = f * z$. We then put:

$$\Delta y = y_{ref} - y$$

$$\Delta z = z_{ref} - z$$

$\Delta y$ is known, we want to estimate $\Delta z$. The relation connecting these residues is expressed as follows:

$$\Delta y = f * \Delta z$$

We suggest decomposing function $f$ as the sum of a dirac centered at 0 and of a complementary function:

$$f = \delta + g$$

where $\delta(0) = a$, a is a sufficiently large constant to ensure convergence. Function g is the same as $f$ everywhere except at 0: $g(0) = f(0) - a$. Extension to greater dimensions is immediate. By introducing this relation in the residue equation, we obtain:

$$\Delta y = (\delta + g) * \Delta z$$
$$= \delta * \Delta z + g * \Delta z$$

This equation becomes, in the spectral domain:

$$\Delta Y = d\Delta Z + G\Delta Z$$

where $\Delta Y$ is the Fourier transform of $\Delta y$, $\Delta Z$ that of $\Delta z$, G that of g and d is a constant equal to $\delta(0)$. By integrating this relation in an iterative relaxation process, we write:

$$\Delta Y_i = d\Delta Z_{i+1} + G\Delta Z_i$$

$$\Delta Z_{i+1} = (\Delta Y_i - G\Delta Z_i)/d$$

The inverse transform of $\Delta z_{i+1}$ provides the correction to be brought to the Gaussian white noise $z_i$.

The latter expression is the core of the algorithm developed to reconstruct a realization. The procedure is as follows.
1. Estimation of the covariance function and calculation of G and d.
2. Initialization: random draw of an initial Gaussian white noise $z_0$, and $\Delta z_0 = 0$.
3. At stage i (i=0, 1, 2, 3...)
4. Simulation of realization $y_i = f * z_i$.
5. Calculation of $\Delta y_i = y_{ref} - y_i$ and of its Fourier transform $\Delta Y_i$.
6. Calculation of $\Delta Z_i$, the Fourier transform of $\Delta z_i$.
7. Calculation of $\Delta Z_{i+1} = (\Delta Y_i - G\Delta Z_i)/d$.
8. Calculation of $\Delta z_{i+1}$, the inverse Fourier transform of $\Delta Z_{i+1}$.
9. Updating $z_{i+1} = z_i + \Delta z_{i+1}$.
10. i=i+1 and return to point 3 until $\Delta y_i$ is sufficiently small.

This reconstruction technique is applicable for the reconstruction of continuous realizations. It can be used alone, but the problem of the definition of the initial Gaussian white noise arises then. An interesting alternative consists in using a Wiener filter in order to rapidly construct an initial Gaussian white noise that can be improved thereafter by relaxation. This point will be dealt with later.

Figure 5A:
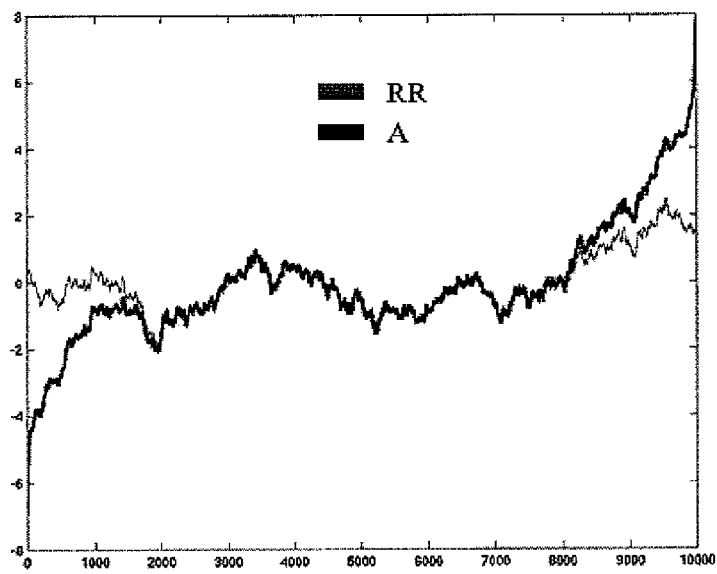
FIG. 5A shows an example of a reference realization (RR) and the model (A) reconstructed from a Wiener filtering, FIG. 5B. shows the characteristics of the Gaussian white noise determined to construct the model of FIG. 5A.
Figure 5B:
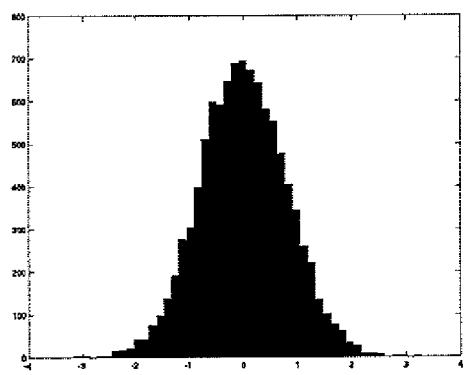

FIGS. 5A, 5B and 6 illustrate an application of this technique of reconstruction by relaxation. We consider a one-dimensional reference realization (RR) discretized with 10,000 cells (abscissa axis) and characterized by a spherical variogram with a correlation length of 3000 cells. First of all, a first approximation of the initial Gaussian white noise is obtained using the Wiener filter: it allows to generate a realization (A) identical to the reference realization, except on the edges (FIG. 5A, where the ordinate axis represents the value of the physical quantity associated with the cell). This white noise is indeed Gaussian as illustrated by the distribution of FIG. 5B. This noise is then corrected iteratively by relaxation. Reconstruction of the reference realization is then much better reproduced as illustrated by FIG. 6, where the abscissa axis represents the number of the cell and the ordinate axis represents the value of the physical quantity associated with the cell.

Reconstruction By Filtering

The third algorithm uses the optimal Wiener filter: it is suitable for geostatistical simulators that depend on a convolution product. This third algorithm allows, in a single iteration, to reconstruct continuous models and it extends to the reconstruction of facies models. Let us go back to the deconvolution problem presented in the previous section. To overcome this difficulty, we propose using an optimal Wiener filter.

In the spectral domain, relation $y_{ref} = f * z_{ref}$ becomes:

$$Y_{ref} = F \cdot Z$$

where $Y_{ref}$, F and Z are respectively the Fourier transforms of $y_{ref}$, $f$ and z. Using the Wiener filter involves replacing $F^{-1}$ by $\overline{F}/(|F|^2 + \epsilon)$ to deduce Z from $Y_{ref}$. $\overline{F}$ is the conjugate of F and $\epsilon$ is a sufficiently small constant. We then estimate the Gaussian white noise z from:

$$z = TF^{-1}\left(\frac{\overline{F}}{(|F|^2 + \varepsilon)} Y_{ref}\right)$$

where $TF^{-1}$ means: inverse Fourier transform.

This reconstruction method is suitable for continuous realizations and it can be extended to the case of facies realizations. The facies realization is therefore converted to a continuous realization. The method described in the following document can be used to that effect:

Le Ravalec, M., et Roggero, F., 2003, *Méthode pour élaborer plus rapidement un modèle stochastique représentatif d'un réservoir hétérogéne souterrain, contraint par des données statiques et dynamiques incertaines*, patent 03/02 199.

Then, a set of random numbers allowing to find this continuous function again is determined. This method is extremely fast because it only requires calculation of three Fourier transforms. On the other hand, it suffers from edge effects. The Gaussian white noise determined does not allow to find again the edges of the reference realization on a width equal to the correlation length. This drawback can be reduced if the reference realization is modified so as to enlarge its support. The symmetry of the reference realization with respect to each edge can for example be taken.

Figure 4:
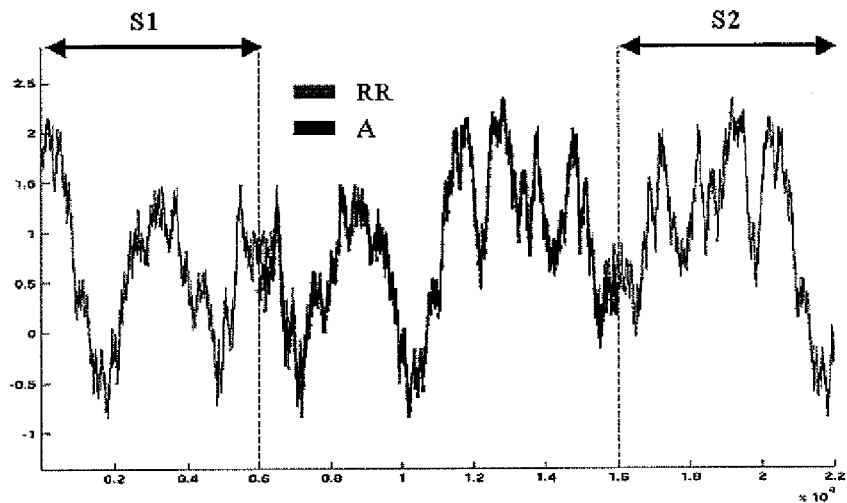
FIG. 4 shows an example of a reference realization (RR) and the model (A) reconstructed from a Wiener filtering applied on a larger support than that of the reference image.

FIG. 4 illustrates an application of this technique of reconstruction by filtering. We consider a one-dimensional reference realization (RR) discretized on 10,000 cells (on the abscissa axis, the ordinate axis representing the value of the physical quantity associated with the cell), and characterized by a spherical variogram with a correlation is length of 3000 cells. The support of the reference realization is enlarged by carrying out, for example, symmetries (S1 and S2 in FIG. 4). When the Wiener filter is applied to this enlarged reference realization, a Gaussian white noise allowing to approximate to the reference realization quite well (realization A in FIG. 4) is obtained.

Sequential Reconstruction

The fourth algorithm relates to sequential geostatistical simulators. It uses the sequential approach used for Gaussian, indicatrix or multipoint sequential simulation algorithms and it allows to reconstruct continuous or facies models. As in the case of optimization, the order in which the cells are visited is frozen. Suppose that the sequential simulation algorithm used visits the cells in the order 1, 2, 3, . . . , N where N is the number of cells. This order is the same for the simulation algorithm and for the reconstruction algorithm. The procedure is as follows.

1. At stage i, visit of cell i.
2. Estimation of the conditional distribution function at this point.
3. Conversion of the value of $y_{ref}$ assigned to this cell to a uniform number according to the identified distribution function.
4. Conversion of the uniform number to a Gaussian number according to the standard normal distribution function.
5. i=i+1 and return to point 1.

This process is suited for Gaussian sequential simulation, indicatrix sequential simulation and sequential simulation with multipoint statistics.

Figure 7A:
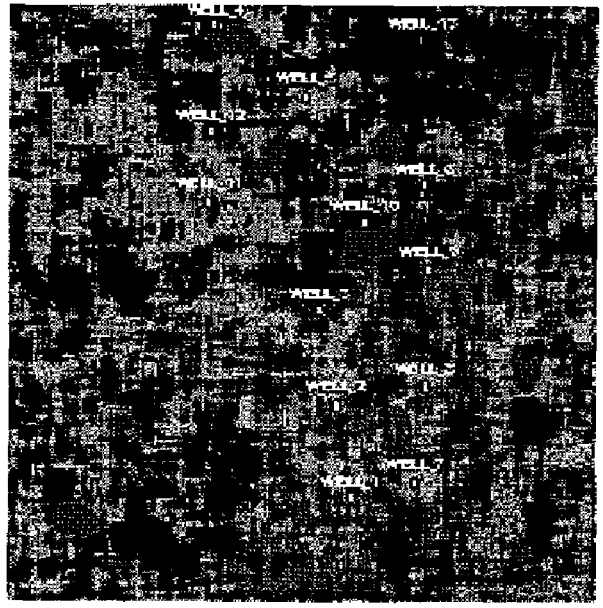
FIG. 7A shows an example of a reservoir model.
Figure 7B:
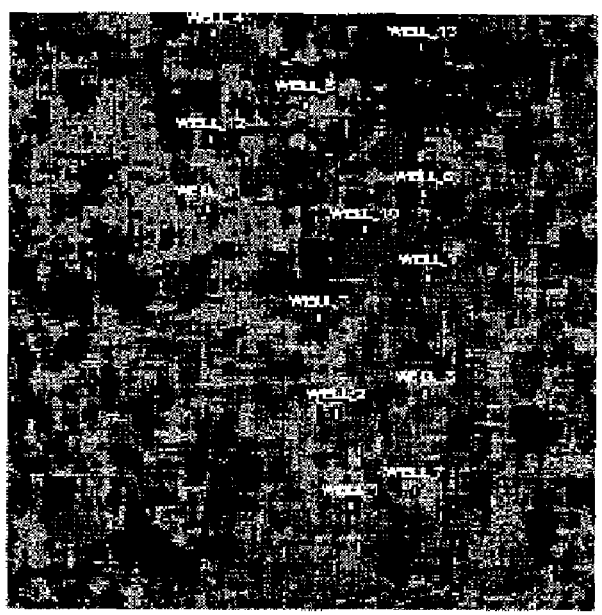
FIG. 7B shows an example of a reference realization reconstructed from a sequential approach with multipoint statistics.

FIGS. 7A and 7B illustrate an application of this sequential reconstruction technique. We want to reconstruct the reservoir image shown in FIG. 7A. The simulation technique to which we refer is the sequential approach with multipoint statistics. FIG. 7B shows the reservoir model reconstructed from a white noise. A very good match is observed between the reference model and the reconstructed model. Differences can be seen only on the edges of the model, on a band whose width depends on the size of the template allowing to apprehend the multipoint statistics.

By providing the reservoir engineer with reconstruction algorithms, the method according to the invention makes it possible for him to reconstruct an already established reservoir model for which the direct construction procedure is not known: neither the random function, nor the random numbers or even the iterative process that had led to calibration of the production data are known any longer.

Furthermore, the reconstruction techniques developed are compatible with the gradual deformation method. In fact, as they go back to the random numbers, they provide a reservoir model that can be locally or globally modified so as to improve calibration with respect to the dynamic data or integrate newly acquired data.

The invention claimed is:

1. A method of reconstructing a numerical stochastic model, defined by an at least one-dimensional grid each cell of which is assigned the value of at least one physical quantity characteristic of a porous heterogeneous medium, characterized in that the method comprises the following stages:
    characterizing a random function by statistical analysis of said values of the cells of said numerical stochastic model,
    selecting a geostatistical simulator,
    identifying a set of random numbers which, given to the geostatistical simulator selected, provides a reconstructed model close to said numerical stochastic model, and
    displaying the reconstructed model.

2. The method as claimed in claim 1, wherein characterization of the random function comprises decomposition of said physical quantity into two terms, a non-stationary mean and a perturbation, to bring out a non-stationary tendency.

3. The method as claimed in claim 1, wherein the stage of identifying the set of the random numbers comprises using one of the following techniques: optimization, relaxation, filtering, sequential method and a combination of these techniques.

4. A The method as claimed in claim 3, wherein the stage of identifying the set of the random numbers comprises using the technique of optimization, and the technique of optimization comprises minimization of an objective function measuring the difference between said numerical stochastic model (yref) and a simulated model (y).

5. The method as claimed in claim 4, wherein the gradient of the objective function with respect to the random numbers is used to reconstruct the model by optimization.

6. The method as claimed in claim 3, wherein the stage of identifying the set of the random numbers comprises using the technique of filtering, and the technique of filtering is applied to a numerical stochastic model whose support has been enlarged to allow to find again the edges of the numerical stochastic model.

7. The method as claimed in claim 3, wherein the stage of identifying the set of the random numbers comprises using the technique of sequential method, and the technique of sequential method comprises blocking the order in which cells are visited.

8. The method as claimed in claim 1, wherein identification of the random numbers allows to modify, by gradual deformation, the reconstructed model in a global or local way.

* * * * *